US012263529B2

(12) United States Patent
Robillos et al.

(10) Patent No.: US 12,263,529 B2
(45) Date of Patent: Apr. 1, 2025

(54) CONDUCTIVE NANOSTRUCTURE PURIFICATION

(71) Applicant: Pine Castle Investments Limited, Tortola (VG)

(72) Inventors: Samuel Lumahan Robillos, Milpitas, CA (US); Ian Storms Moody, Soquel, CA (US); Haixia Lumahan Dai, Pleasanton, CA (US)

(73) Assignee: Pine Castle Investments Limited, Tortola (VG)

( * ) Notice: Subject to any disclaimer, the term of this patent is extended or adjusted under 35 U.S.C. 154(b) by 787 days.

(21) Appl. No.: 17/600,719

(22) PCT Filed: Apr. 1, 2020

(86) PCT No.: PCT/US2020/026059
§ 371 (c)(1),
(2) Date: Oct. 1, 2021

(87) PCT Pub. No.: WO2020/205900
PCT Pub. Date: Oct. 8, 2020

(65) Prior Publication Data
US 2022/0168807 A1 Jun. 2, 2022

Related U.S. Application Data

(60) Provisional application No. 62/828,654, filed on Apr. 3, 2019.

(51) Int. Cl.
*B22F 9/24* (2006.01)
*B03D 3/00* (2006.01)
(Continued)

(52) U.S. Cl.
CPC .................. *B22F 9/24* (2013.01); *B03D 3/00* (2013.01); *B22F 1/0545* (2022.01);
(Continued)

(58) Field of Classification Search
CPC ........ B03D 3/00; B03D 1/026; B03D 1/1481; B22F 9/24
See application file for complete search history.

(56) References Cited

U.S. PATENT DOCUMENTS

| 7,560,366 B1 | 7/2009 | Romano et al. |
| 9,205,493 B1 | 12/2015 | Young et al. |

(Continued)

FOREIGN PATENT DOCUMENTS

| CN | 103874532 A | 6/2014 |
| CN | 106573299 A | 4/2017 |

(Continued)

OTHER PUBLICATIONS

International Search Report and Written Opinion cited in PCT/US20/26059 mailed Jul. 9, 2020, 16 pages.

*Primary Examiner* — Jenny R Wu
(74) *Attorney, Agent, or Firm* — Cooper Legal Group, LLC (57) ABSTRACT

A method of purifying a metal nanostructure composition containing desired nanostructures and undesired nanostructures. The method includes providing a solution within which metal nanostructures have been synthesized including desired and undesired nanostructures. The solution includes polyol and has a viscosity. The method includes diluting the solution with a dilutant to lower the viscosity of the solution and provide a diluted solution. The method includes sedimenting the undesired nanostructures from the diluted solution. The method includes collecting the supernatant with the desired nanostructures and retaining the undesired nanostructures inside the sedimentation device. In an example, such is via a sedimentation device, which is a special tray system designed with grooved bottoms to retain the undesired nanostructures.

16 Claims, 8 Drawing Sheets

(51) Int. Cl.
  *B22F 1/054* (2022.01)
  *B22F 1/0545* (2022.01)
  *B22F 1/07* (2022.01)
  *B22F 1/10* (2022.01)
  *B22F 1/107* (2022.01)
  *B22F 1/148* (2022.01)
  *H01B 1/02* (2006.01)

(52) U.S. Cl.
  CPC ............. *B22F 1/0547* (2022.01); *B22F 1/07* (2022.01); *B22F 1/10* (2022.01); *B22F 1/107* (2022.01); *B22F 1/148* (2022.01); *B22F 2304/05* (2013.01); *H01B 1/02* (2013.01)

(56) References Cited

U.S. PATENT DOCUMENTS

| | | |
|---|---|---|
| 2009/0223703 A1 | 9/2009 | Winoto |
| 2011/0045272 A1 | 2/2011 | Allemand |
| 2013/0160608 A1 | 6/2013 | Nusko et al. |
| 2017/0120341 A1* | 5/2017 | Simonato ............... B82Y 30/00 |

FOREIGN PATENT DOCUMENTS

| | | |
|---|---|---|
| JP | H0231626 A | 2/1990 |
| TW | 201125730 A | 8/2011 |

* cited by examiner

CONDUCTIVE NANOSTRUCTURE PURIFICATION

RELATED APPLICATION

This application claims priority to U.S. Provisional Application Ser. No. 62/828,654, titled "CONDUCTIVE NANOSTRUCTURE PURIFICATION" and filed on Apr. 3, 2019, which is incorporated herein by reference.

FIELD

This disclosure is related to purification of metal nanostructures.

BACKGROUND

Transparent conductors include optically-clear and electrically-conductive films. One of the key applications for silver nanowires (AgNWs) today is in forming transparent conductor (TC) layers in electronic devices, such as touch panels, photovoltaic cells, flat liquid crystal displays (LCD), organic light emitting diodes (OLED), wearable devices, etc. Various technologies have produced transparent conductors based on one or more conductive media such as conductive nanostructures. Generally, the conductive nanostructures form a conductive network through long-range interconnectivity.

As the number of applications employing transparent conductors continues to grow, improved production methods such as purification methods are required to satisfy the demand for conductive nanostructures. Traditional purification techniques attempt to reduce the levels of undesired contaminants through sedimentation, centrifugation, filtration, etc. However, conventional techniques are not suitable to reduce the undesired contaminants from the reaction crude of conductive nanostructures at scales larger than benchtop due to non-efficient separation of the conductive nanostructures from the undesired contaminants.

BRIEF SUMMARY

According to an aspect, the subject disclosure provides a method of purifying a metal nanostructure composition containing desired nanostructures and undesired nanostructures. The method includes providing a solution within which metal nanostructures have been synthesized including desired and undesired nanostructures. The solution includes polyol and has a viscosity. The method includes diluting the solution with a dilutant to lower the viscosity of the solution and provide a diluted solution. The method includes sedimenting the undesired nanostructures from the diluted solution. The method includes collecting the supernatant with the desired nanostructures and retaining the undesired nanostructures inside the sedimentation device. Within an example, such is via a sedimentation device, which is a special tray system designed with grooved bottoms to retain the undesired nanostructures.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

The disclosed subject matter may take physical form in certain parts and arrangement of parts, embodiments of which will be described in detail in this specification and illustrated in the accompanying drawings which form a part hereof and wherein.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

Certain terminology is used herein for convenience only and is not to be taken as a limitation on the disclosed subject matter. Relative language used herein is best understood with reference to the drawings, in which like numerals are used to identify like or similar items. Further, in the drawings, certain features may be shown in somewhat schematic form.

The following subject matter may be embodied in a variety of different forms, such as methods, devices, components, and/or systems. Accordingly, this subject matter is not intended to be construed as limited to any illustrative embodiments set forth herein as examples. Rather, the embodiments are provided herein merely to be illustrative.

Provided herein is a method of isolating and purifying conductive nanostructures from a process mixture. For example, provided is a method of purifying a metal nanostructure composition containing desired nanostructures and undesired nanostructures. The method includes providing a solution within which metal nanostructures have been synthesized including desired and undesired nanostructures. The solution includes polyol and has a viscosity. The method includes diluting the solution with a dilutant to lower the viscosity of the solution and provide a diluted solution. The method includes sedimenting the undesired nanostructures from the diluted solution. The method includes collecting the supernatant with the desired nanostructures and retaining the undesired nanostructures inside the sedimentation device. In an example, such is via a sedimentation device, which is a special tray system designed with grooved bottoms to retain the undesired nanostructures.

As used herein, "conductive nanostructures" or "nanostructures" generally refer to electrically conductive nano-sized structures, at least one dimension of which is less than 200 nm. However, the dimension can be less than 500 nm, 250 nm, 100 nm, 50 nm, 25 nm, 15 nm, or 10 nm for examples. Typically, the nanostructures are made of a metallic material, such as an elemental metal (e.g., transition metals) or a metal compound (e.g., metal oxide). The metallic material can also be a bimetallic material or a metal alloy, which comprises two or more types of metal. Suitable metals include, but are not limited to, silver, gold, copper, nickel, gold-plated silver, platinum and palladium.

The nanostructures can be of any shape or geometry. The morphology of a given nanostructure can be defined in a simplified fashion by its aspect ratio, which is the ratio of the length over the diameter of the nanostructure. For instance, certain nanostructures are isotropically shaped (i.e., aspect ratio=1). Typical isotropic nanostructures include nanoparticles. In preferred embodiments, the nanostructures are anisotropically shaped (i.e., aspect ratio≠1). The anisotropic nanostructure typically has a longitudinal axis along its length. Some example anisotropic nanostructures include nanowires, nanorods, and nanotubes, as defined herein.

The nanostructures can be solid or hollow. Solid nanostructures include, for example, nanoparticles, nanorods and nanowires ("NWs"). NWs typically refers to long, thin nanostructures having aspect ratios of greater than 10, preferably greater than 50, and more preferably greater than 100. Nanowires can be more than 200 nm in length, or even more than 1 µm, or more than 10 µm long. "Nanorods" are typically short and wide anisotropic nanostructures that have aspect ratios of no more than 10. Although the present disclosure is applicable to purifying any type of nanostructure, for the sake of brevity the purification of silver nanowires ("AgNWs" or abbreviated simply as "NWs") to separate out large particles (e.g., particles that have all dimension in excess of 50 nm) will be described as an example.

Electrical and optical properties of a transparent conductor (TC) layer are strongly dependent on the physical dimensions of NWs—i.e. their length and diameter, and more generally, their aspect ratio. NWs with larger aspect ratios form a more efficient conductive network by allowing a lower density of wires to achieve higher transparency for a given film resistivity. Because each NW can be considered a conductor, individual NW length and diameter will affect the overall NW network conductivity and, therefore, the final film conductivity. For example, as nanowires get longer, fewer are needed to make a conductive network; and as NWs get thinner, NW resistivity increases—making the resulting film less conductive for a given number of NWs.

Similarly, NW length and diameter will affect the optical transparency and light diffusion (haze) of the TC layers. NW networks are optically transparent because nanowires comprise a very small fraction of the film. However, the nanowires absorb and scatter light, so NW length and diameter will, in large part, determine optical transparency and haze for a conductive NW network. Generally, longer and thinner NWs enable increased transmission and reduced haze in TC layers—desired properties for electronic applications.

Furthermore, low aspect ratio nanostructures (a byproduct of the synthesis process) in the TC layer result in added haze as these structures scatter light without contributing to the conductivity of the network. Because synthetic methods for preparing metal nanostructures typically produce a composition that includes a range of nanostructure morphologies, both desirable and undesirable, there is a need to purify such a composition to promote retention of high aspect ratio nanostructures. The retained nanostructures can be used to form TCs having desired electrical and optical properties.

The NWs can be produced by a solution-based synthesis, for example, the "polyol" process, that is reasonably effective in large-scale production of metal nanostructures. See, e.g., Sun, Y. et al., (2002) *Science,* 298, 2176; Sun, Y. et al., (2002) Nano Lett. 2, 165. The polyol process involves the reduction of a precursor (e.g., a metal salt) of the metal nanostructure by a polyol, an organic compound comprising at least two hydroxyl groups (e.g., ethylene glycol), in the presence of poly(vinyl pyrrolidone) ("PVP"). Typically, the polyol serves the dual functions of the reducing agent as well as the solvent. Example polyols include, but are not limited to, ethylene glycol, 1,2-propylene glycol, 1,3-propylene glycol, and glycerol.

Although the polyol process may be optimized to produce predominately NWs, in reality a complex collection of nanostructures are formed as reaction byproducts. For example, besides NWs, metal or metal halide nanostructures of various morphologies, including nanoparticles, nanocubes, nanorods, nanopyramids and multi-ply twinned particles, may also be produced. Some of such nanostructures can have relatively larger dimensions. Such larger-dimension nanostructures must be separated from the relatively smaller dimension nanostructures. As some examples, without limitation upon the present disclosure, the larger dimensions can be dimensions that exceed 50 nm in size.

As discussed herein, to form a TC in which nanostructures form a conductive network, it may be desirable to reduce the amount of byproduct nanostructures present, other than NWs, because the other nanostructures may not effectively contribute to conductivity, and their presence may contribute to haze. As used herein, "low aspect ratio nanostructures" or "contaminants," includes, for example, nanostructures that are relatively wide and/or short (e.g., nanoparticles, nanorods), and have a relatively small aspect ratio (<10). Some or all of these low aspect ratio nanostructures may be seen as "bright objects" in a conductive film due to their bright appearance on dark field micrographs. The bright objects may, thus, significantly increase the haze of the conductive film. According to some embodiments, "contaminants" includes large nanostructures such as NWs or nanorods with a diameter of at least 50 nm, or other nanostructures in which all dimensions are at least 50 nm.

Isolating NWs from the contaminants in a reaction mixture of crude products has proved to be difficult or inefficient. In particular, an isolation method may involve sedimentation, which allows for the nanostructures to sediment while a liquid phase including the polyol and PVP forms the supernatant. However, the contaminants commonly co-sediment with the NWs and become very difficult to separate. In addition, the co-sedimented NWs and the contaminants are often difficult to be re-suspended in a liquid phase, impeding any effort of further purification. Moreover, certain polyol solvents are so viscous at room temperature (e.g., glycerol) that a protracted sedimentation process may be necessary before any appreciative amount of nanostructures can sediment.

Figure 1A:
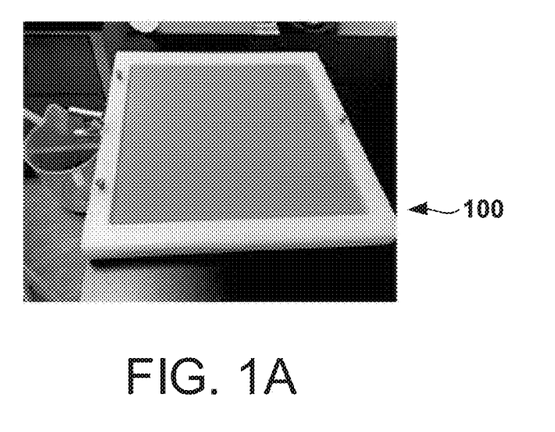
FIG. 1A is a picture showing an example tray with a grooved bottom used for purifying a metal nanostructure composition containing desired nanostructures and undesired nanostructures via sedimentation, with a mixture of desired nanostructures and undesired nanostructures provided prior to purification.
Figure 1B:
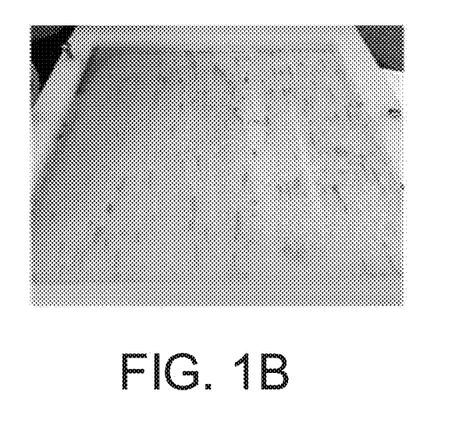
FIG. 1B shows the example tray of FIG. 1A subsequent to purification with undesired nanostructures retained in the grooved bottom.

Thus, embodiments provide a post-synthesis purification method that removes contaminants such as, for example large particles greater than 50 nm in diameter, from a crude reaction mixture that includes both the NWs and the contaminants. In one example, the purification process involves a sedimentation method using a shallow tray 100 with grooved bottom as shown in FIG. 1A. For example, the depth of the tray can optionally be no more than 1 in. (2.54 cm), or no more than 0.75 in. (1.91 cm), or no more than 0.5 in. (1.27 cm), or no more than 0.25 in. (0.64 cm), etc. For some embodiments, separation is achieved by establishing a suitable viscosity of the mixture fluid, height of the fluid within the tray, sedimentation time, with suitably-small grooves (e.g., elongated troughs in a V shape having a width less than 2.6 mm (approx. 0.1 in.) and height slightly less than 1.3 mm (approx. 0.05 in.), or troughs with other shapes or dimensions) at the bottom to retain particles. In general, low viscosity, shorter sedimentation height favors quicker separation; and the grooves at the bottom helps retain the particles as shown in FIG. 1B.

According to embodiments of the purification method, the viscosity of a mixture fluid comprising nanoparticles, including for example large particles greater than 50 nm in diameter, is adjusted based on the height of the fluid within the tray, sedimentation time, and size of the grooves in the tray. The mixture fluid having the adjusted viscosity is introduced into a shallow tray that is no greater than one inch (1 in.) in depth and comprises elongated troughs on a bottom surface. Adjustment of the mixture fluid comprising nanoparticles is via dilution. In an example, the dilutant can be water, or an alcohol such as methanol, ethanol, isopropyl alcohol (IPA), etc.

After a prescribed time, the large particles settled into the grooved bottom and separated from the liquid portion of the mixture fluid. Then the liquid portion of the mixture fluid is drained from the shallow tray while the large particles remained in the grooves of the tray.

Figure 2:
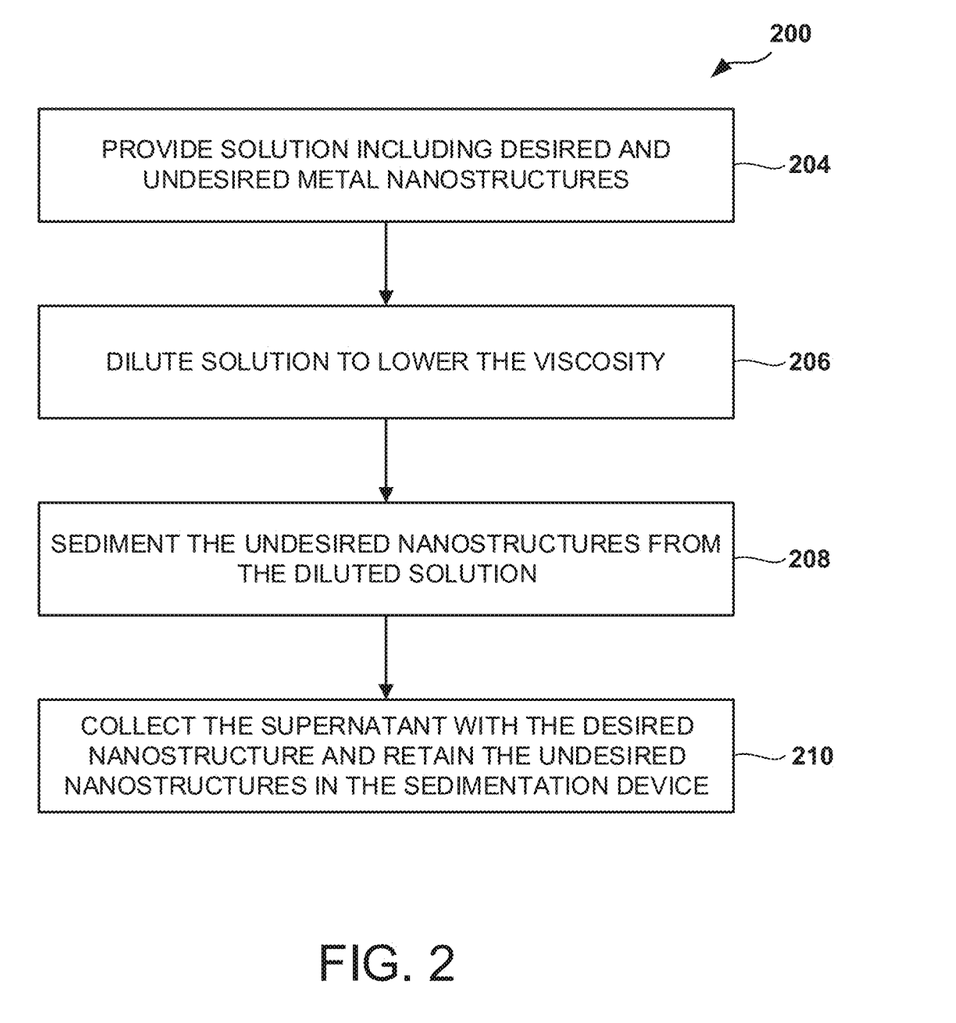
FIG. 2 is a top-level flowchart for an example method in accordance with the present disclosure.
Figure 3A:
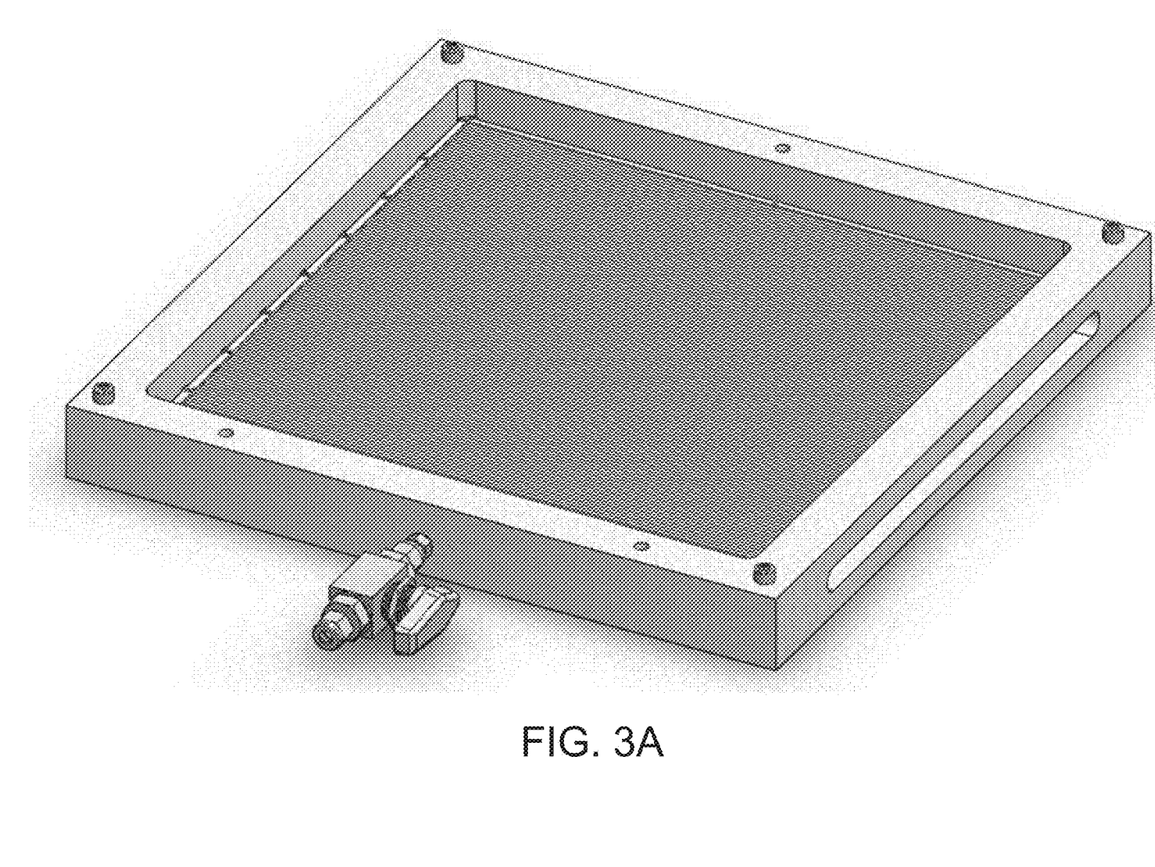
FIGS. 3A-3D are various views of an example shallow tray that could be used as part of a method of the present disclosure.
Figure 3B:
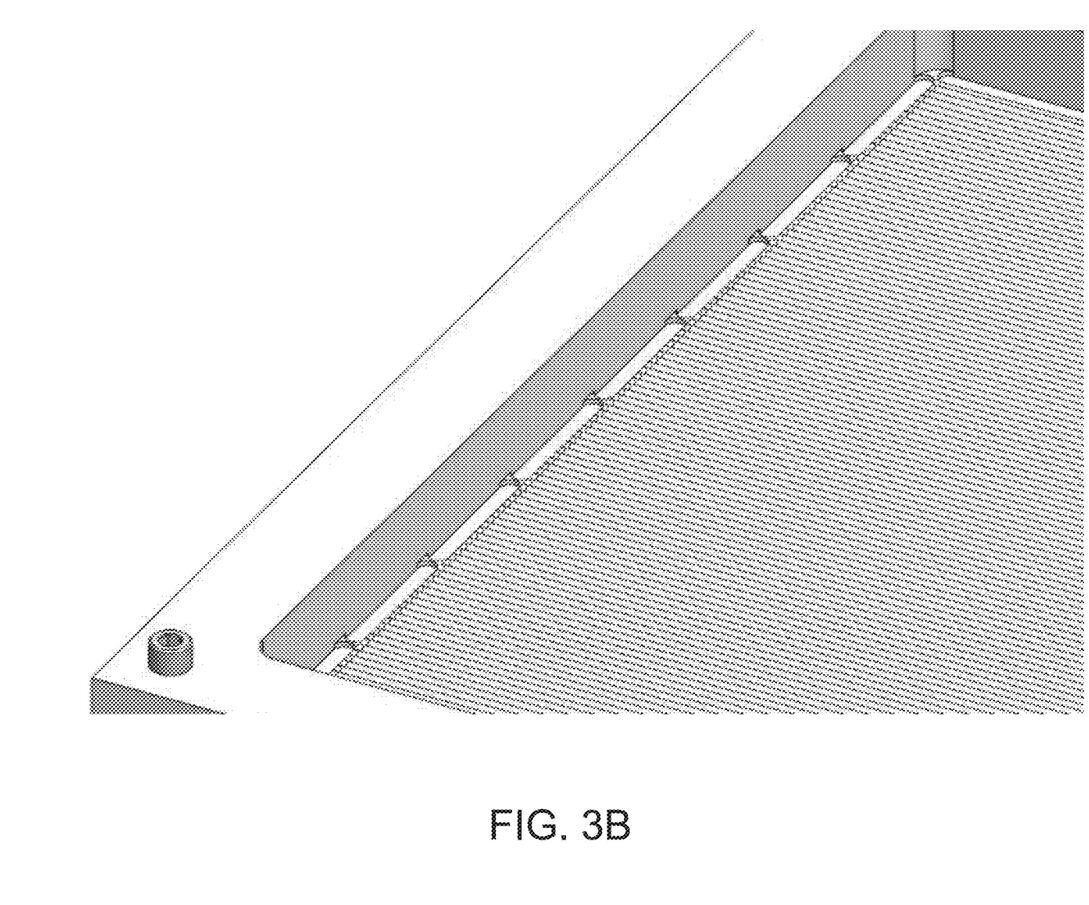
Figure 3C:
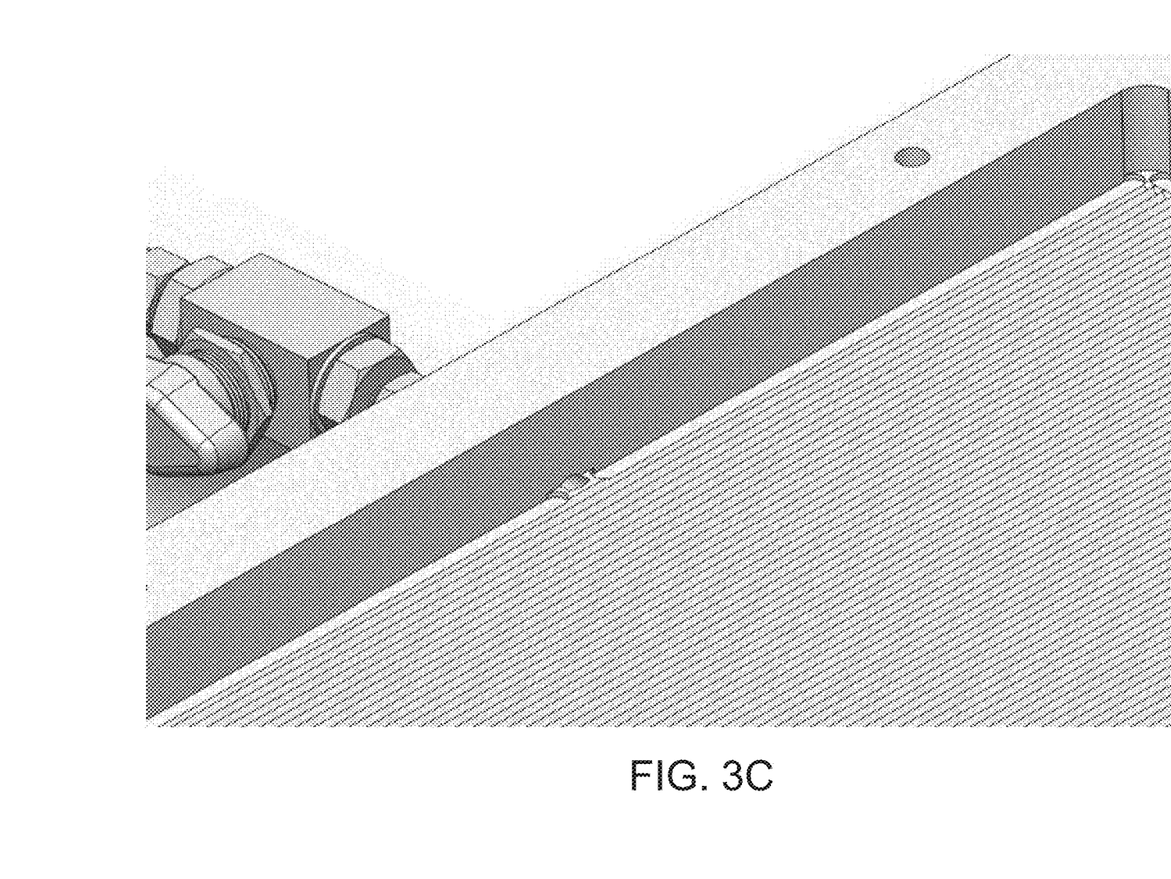
Figure 3D:
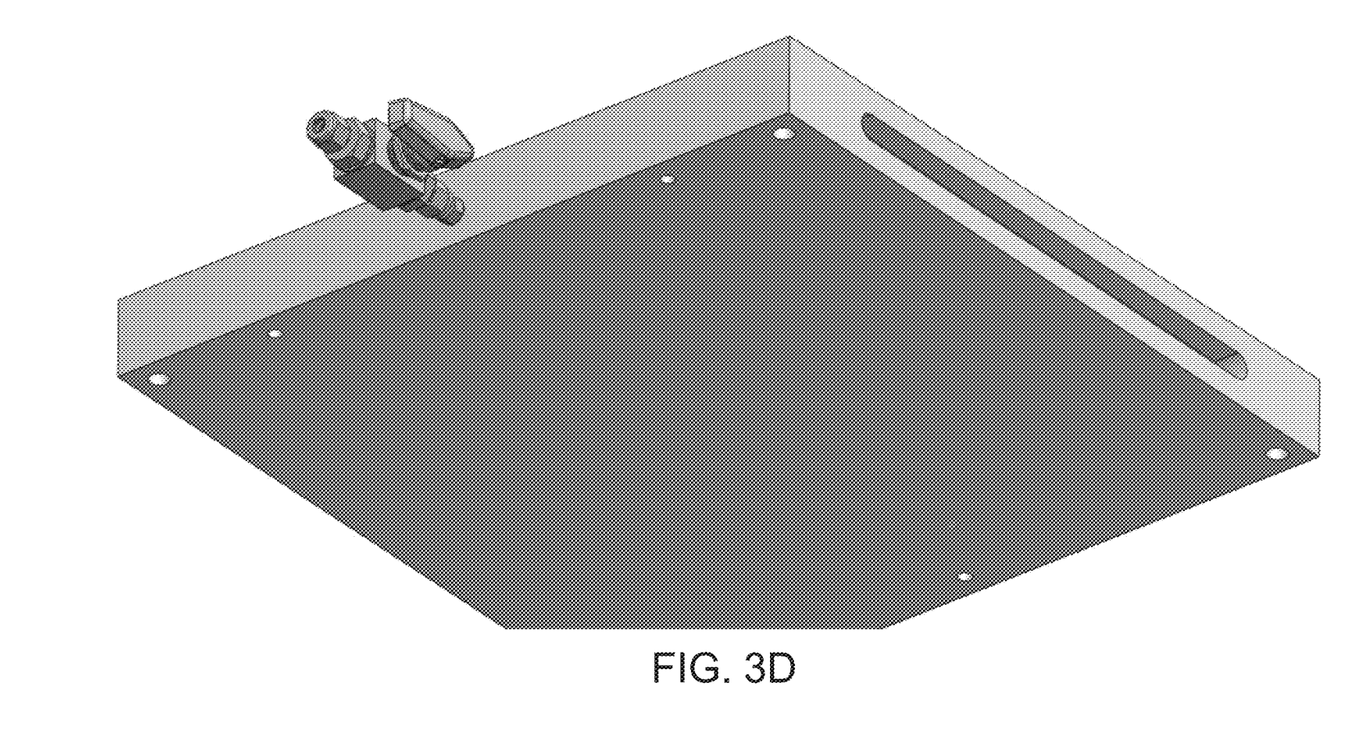

As a top-level overview of the method of the present disclosure, FIG. 2 provides a flowchart for an example method 200. As a first step 204 of the method 200, a solution is provided. Within the solution, metal nanostructures have been synthesized. The solution includes desired and undesired nanostructures, and the solution includes polyols and has a viscosity. At step 206, the solution is diluted to lower the viscosity. At step 208, one of the undesired nanostructures is sedimented from the diluted solution. At step 210, the supernatant with desired nanostructures is collected and the undesired nanostructures are retained in the sedimentation device.

Within a specific example, the undesired nanostructures are sedimented from the diluted solution. Moreover, within a specific example, the undesired nanostructures have dimensions in all directions of at least 50 nm. However, the top-level overview of the method need not be so limited. Such breath of the top-level overview of the method would allow a possible reversal such that the desired nanostructures are sedimented from the diluted solution. Accordingly, such is within the scope of the present disclosure.

It is to be appreciated that step of dilution and the improvement concerning sedimentation time are aspects of the present disclosure. Some comparative examples, discussed following, show such.

Table 1 shows the large particle count during/after purification process for two different viscosities. Specifically, two mixtures, Mixture 1 and Mixture 2, with the mixtures each containing both desired (e.g., nanowire) and undesired (e.g., large particles) but with different viscosities are permitted to have sedimentation occur over a number of days.

The mixture 1 has a lower viscosity and the particle per nanowire level decreased from 0.053 to 0.003 in only three days. The mixture 2 has a higher viscosity and the particle per nanowire level is still quite high (0.012) even after 13 days of sedimentation.

TABLE 1

(Numeric indications of large particles per nanowire)

| | Viscosity (cP at shear rate of 1000 S$^{-1}$) | Day 0 | Day 3 | Day 5 | Day 13 |
|---|---|---|---|---|---|
| Mixture 1 | 2.1 | 0.053 | 0.003 | | |
| Mixture 2 | 34.8 | 0.064 | 0.035 | 0.035 | 0.012 |

As mentioned in one example, a device (e.g., shallow tray 100, see FIGS. 1A and 1B) can be used within the purification process method of the present disclosure. Such a device can aid in retention of nanostructures that are sedimented from the diluted solution. It is to be appreciated that the method need not be limited by the associated device and that different/modified devices could be used within the method of the present disclosure. Such different/modified devices, and use thereof, are within the scope of this disclosure.

Although the purification process method need not be so limited, FIGS. 3A-3D are provided to show some example details of a device (e.g., shallow tray). As can be appreciated upon viewing FIGS. 3A-3D, a valved outlet tap or spigot is provided to extract (i.e., drain) solution once sedimentation/purification has occurred. Within the shown example of FIGS. 3A-3D, the grooves are orientated traverse (e.g., perpendicular) to the outflow direction associated with the valved outlet.

Figure 4:
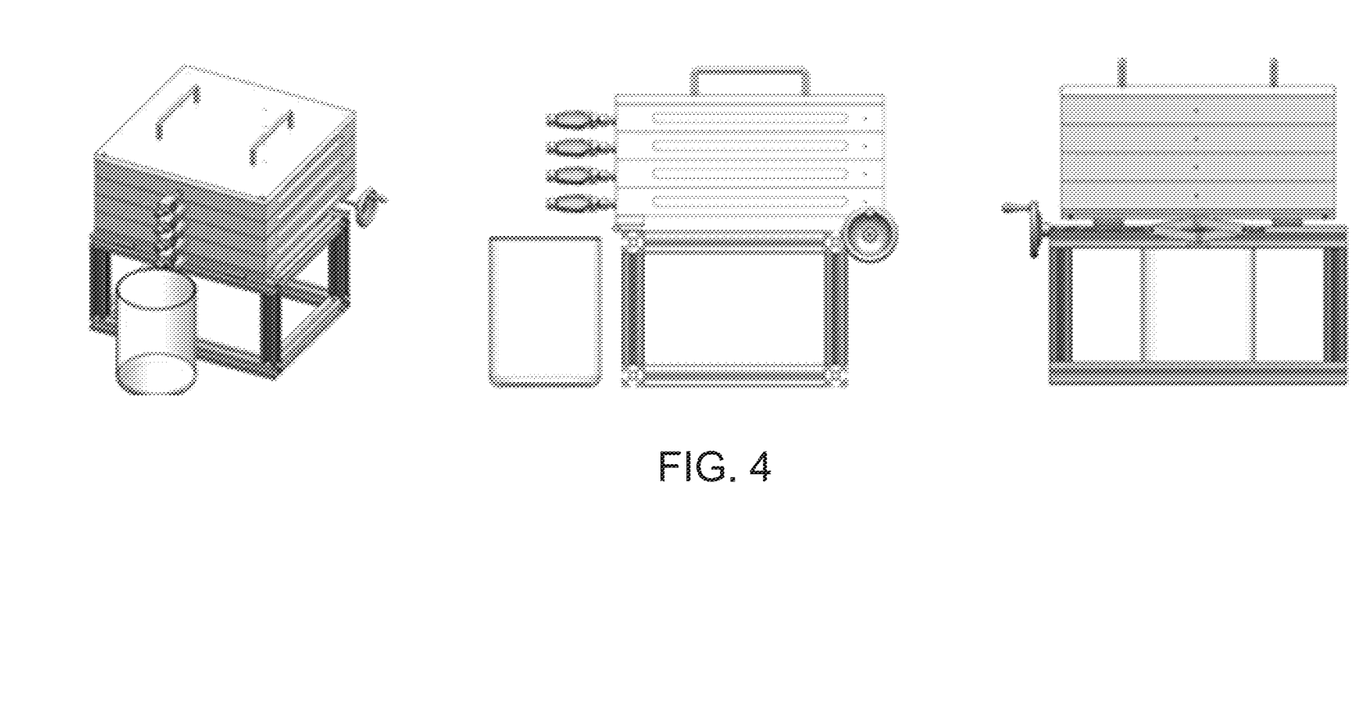
FIG. 4 is a collection of views of an example arrangement that includes multiple trays that could be used as part of a method of the present disclosure.

It is to be appreciated that productivity can be scaled-up. As one example, multiple devices (e.g., multiple shallow trays) could be employed. Such is not required and need not be a limitation upon the present disclosure. Nonetheless, an example is shown in FIG. 4. FIG. 4 is a collection of views (perspective, side and back) of an example arrangement that includes multiple trays. Again, such is just an example and need not be a limitation upon the present disclosure. Many other/different multiple tray arrangements are possible, contemplated and are thus within the scope of this disclosure.

Figure 5:
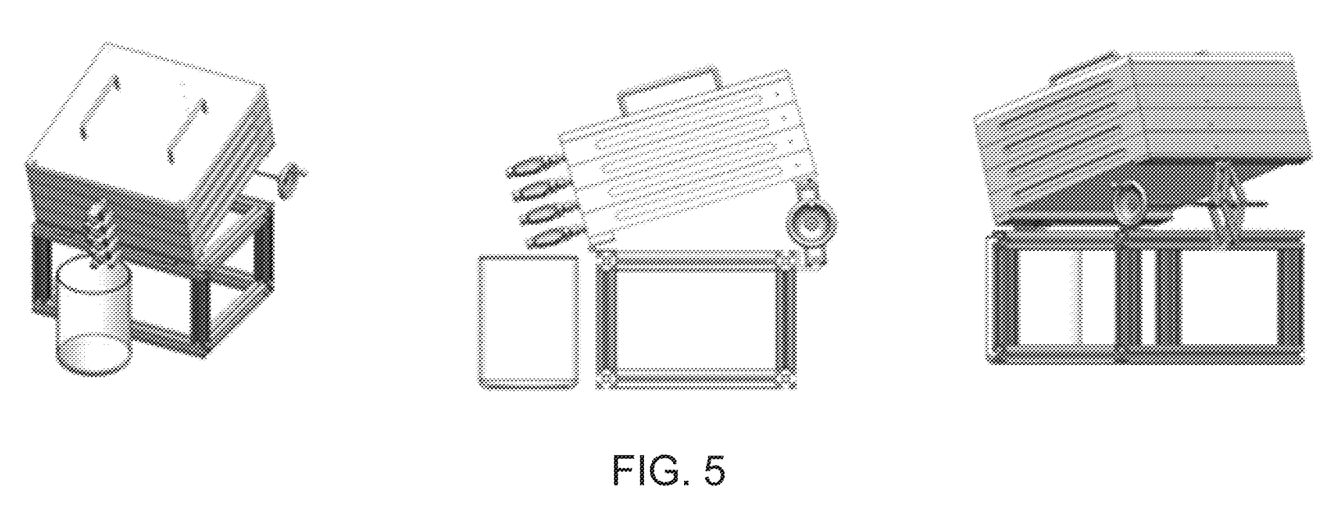
FIG. 5 is a collection of views similar to FIG. 4, but shows simultaneous handling.

Also, as an example that productivity can be scaled-up, simultaneous handling (i.e., operation thereof) of portions of solution/trays could be employed. As one example, attention is directed to FIG. 5. FIG. 5 is similar to FIG. 4, but shows simultaneous tilting, to extract (i.e., drain) solution once sedimentation/purification has occurred. Again, such is just an example and need not be a limitation upon the present disclosure. Many other/different multiple tray arrangements, and the simultaneous handling thereof, are possible, contemplated and are thus within the scope of this disclosure.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example," "illustrative embodiment," are used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of purifying a metal nanostructure composition, the method comprising:
   providing a solution within which metal nanostructures have been synthesized including first aspect ratio nanostructures and second aspect ratio nanostructures having an aspect ratio lower than the first aspect ratio nanostructures, the solution including a polyol and having a viscosity;
   diluting the solution with a dilutant to lower the viscosity of the solution and provide a diluted solution; and
   sedimenting the second aspect ratio nanostructures from the diluted solution, wherein the method includes introducing the diluted solution into a device that aids in retention of the first aspect ratio nanostructures in the diluted solution and removal of the second aspect ratio nanostructures that are sedimented from the diluted solution and the device includes a tray having a grooved bottom orientated traverse to an outflow direction associated with an outlet of the device.

2. The method of claim 1, wherein the first aspect ratio nanostructures remain in the diluted solution.

3. The method of claim 1, wherein the second aspect ratio nanostructures have all dimensions of at least 50 nm.

4. The method of claim 1, wherein the device has a depth that is no more than 1 inch.

5. The method of claim 4, wherein a depth of the tray is no more than 0.5 inch.

6. The method of claim 5, wherein a depth of the tray is no more than 0.25 inch.

7. The method of claim 1, wherein the grooved bottom has elongated troughs.

8. The method of claim 7, wherein the elongated troughs have a V shape and have a width less than 0.1 inch and a height less than 0.05 inches.

9. The method of claim 1, including introducing the diluted solution into multiple devices that aid in retention of the first aspect ratio nanostructures in the diluted solution and removal of the second aspect ratio nanostructures that are sedimented from the diluted solution, and subsequently simultaneously operating upon the multiple devices.

10. The method of claim 1, wherein the dilutant includes at least one of water or alcohol.

11. The method of claim 1, wherein the dilutant is an alcohol.

12. The method of claim 1, wherein the polyol includes ethylene glycol.

13. The method of claim 1, wherein the polyol includes propylene glycol.

14. The method of claim 1, wherein the polyol includes glycerol.

15. The method of claim 1, wherein the step of sedimenting the second aspect ratio nanostructures from the diluted solution occurs for a time period of 5 days or less.

16. The method of claim 1, wherein the step of sedimenting the second aspect ratio nanostructures from the diluted solution occurs for a time period of 3 days or less.

* * * * *